May 25, 1926.
M. VIERENGEL
1,586,055
MACHINE FOR CUTTING OUT BLANKS FOR ENVELOPES, ENVELOPE
BAGS, BAGS, FOLDING BOXES, ETC
Filed Nov. 23, 1923      9 Sheets-Sheet 1
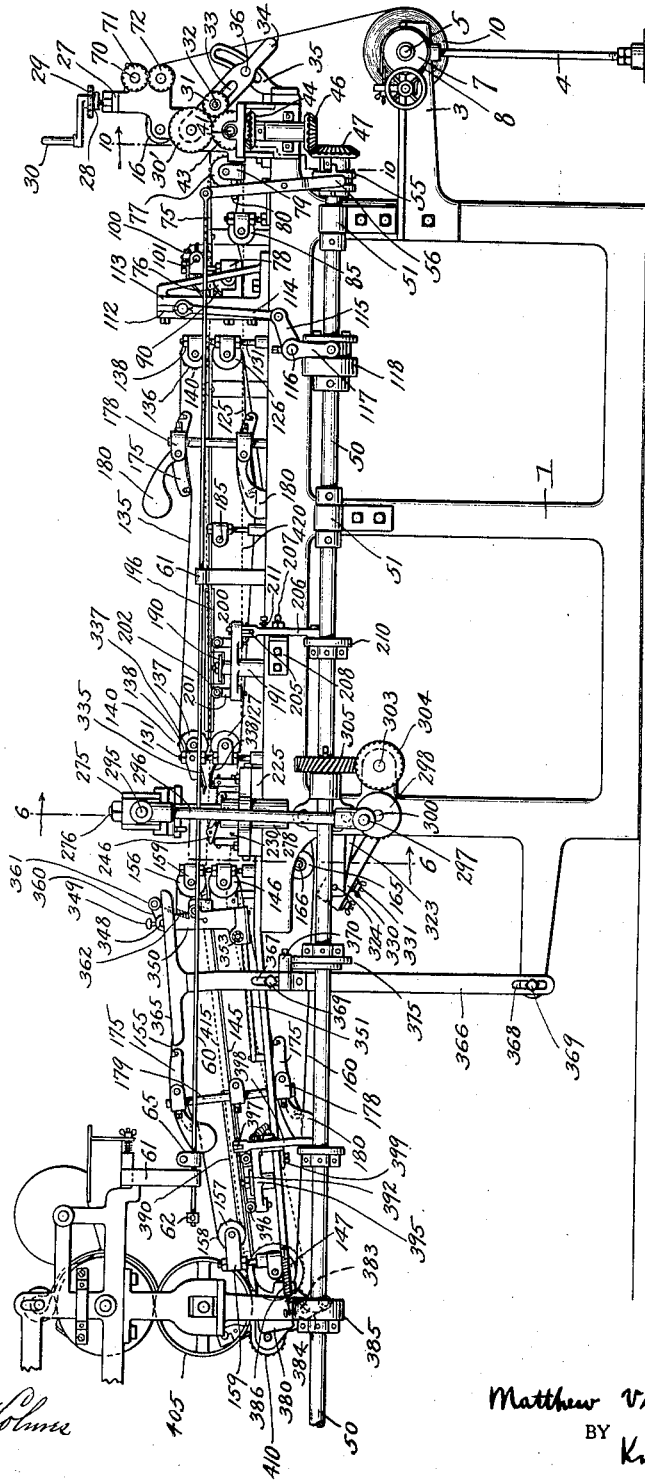
WITNESSES
INVENTOR
Matthew Vierengel
BY Knight
ATTORNEYS

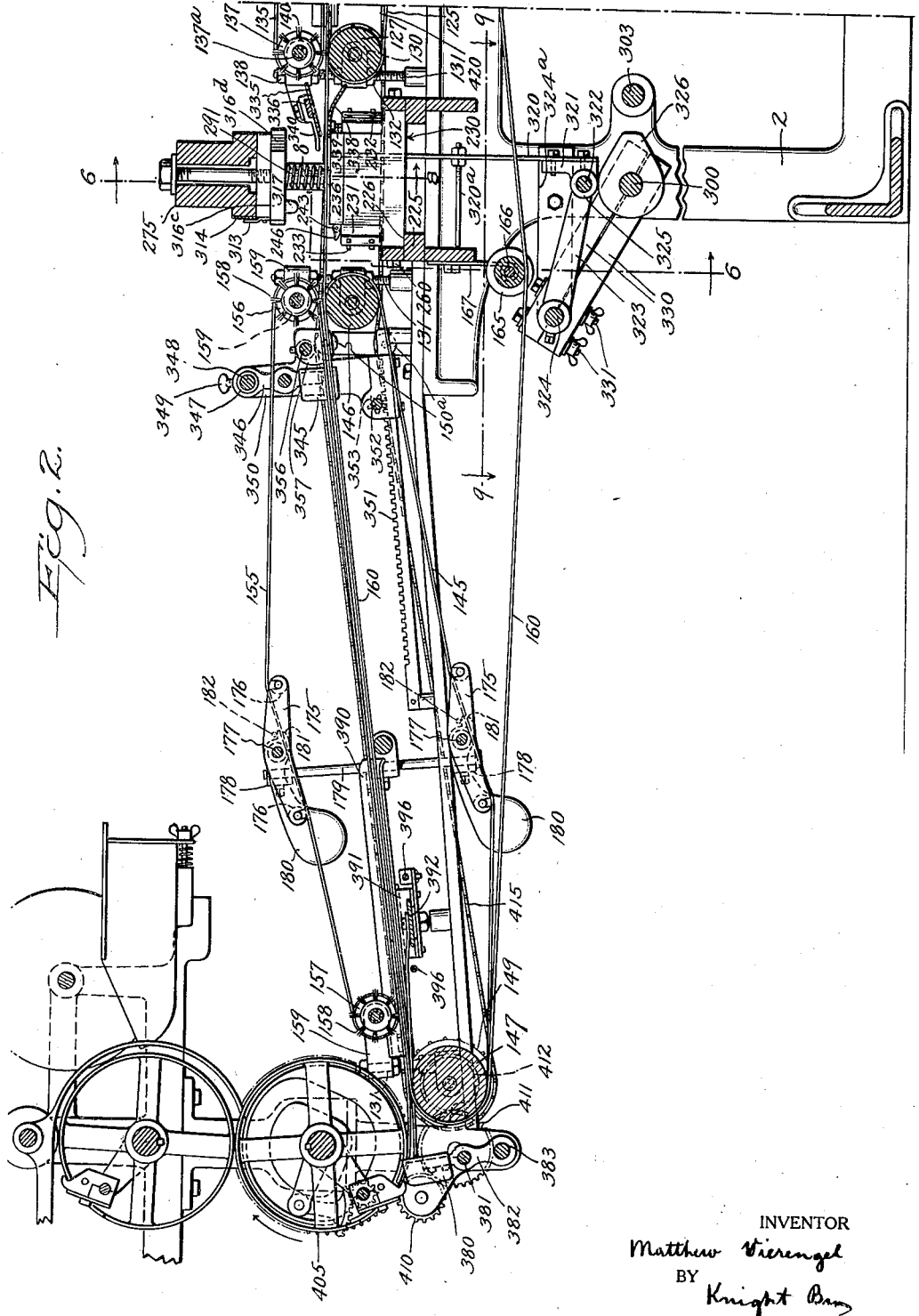

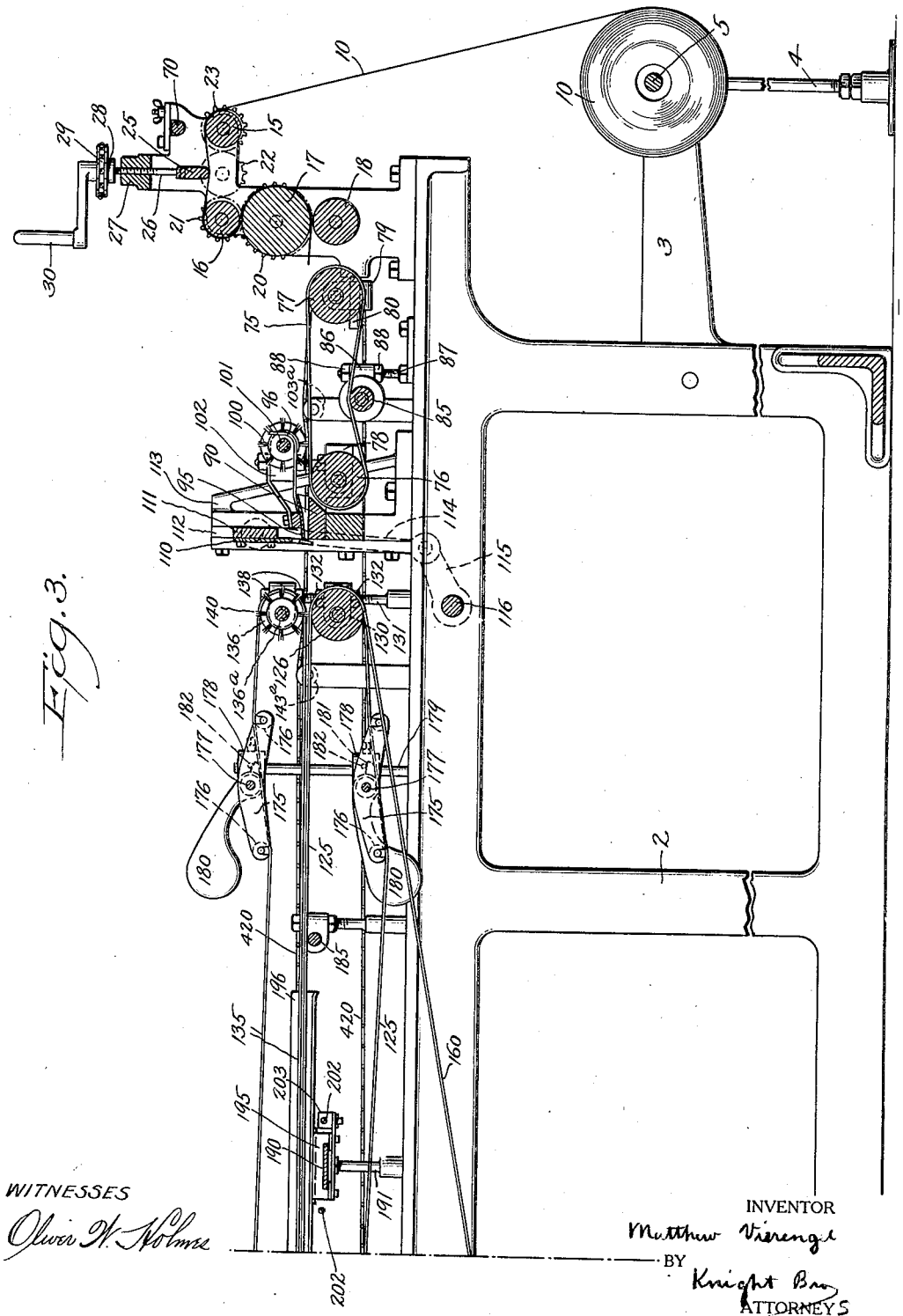

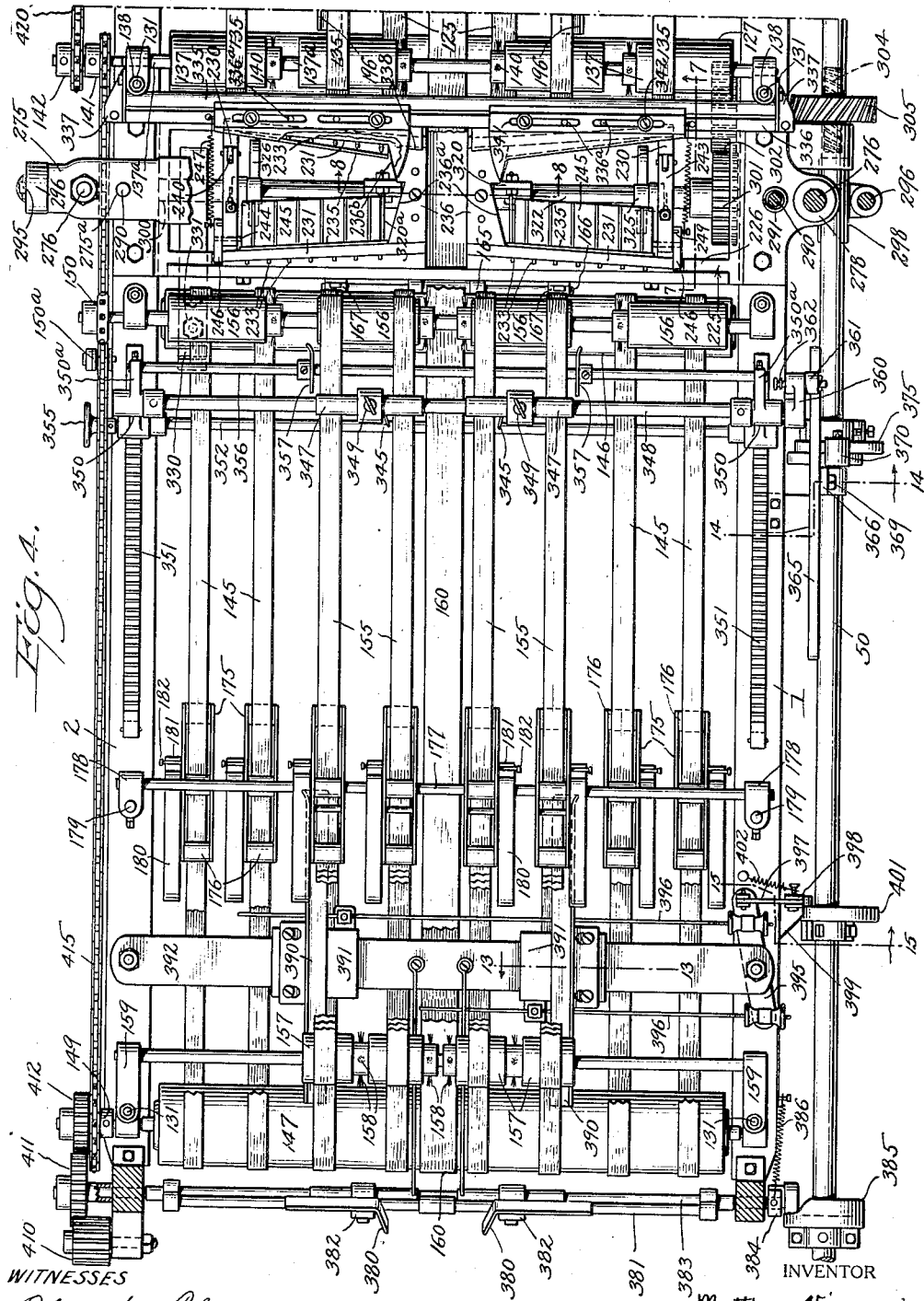

May 25, 1926. 1,586,055
M. VIERENGEL
MACHINE FOR CUTTING OUT BLANKS FOR ENVELOPES, ENVELOPE
BAGS, BAGS, FOLDING BOXES, ETC
Filed Nov. 23, 1923 9 Sheets-Sheet 5
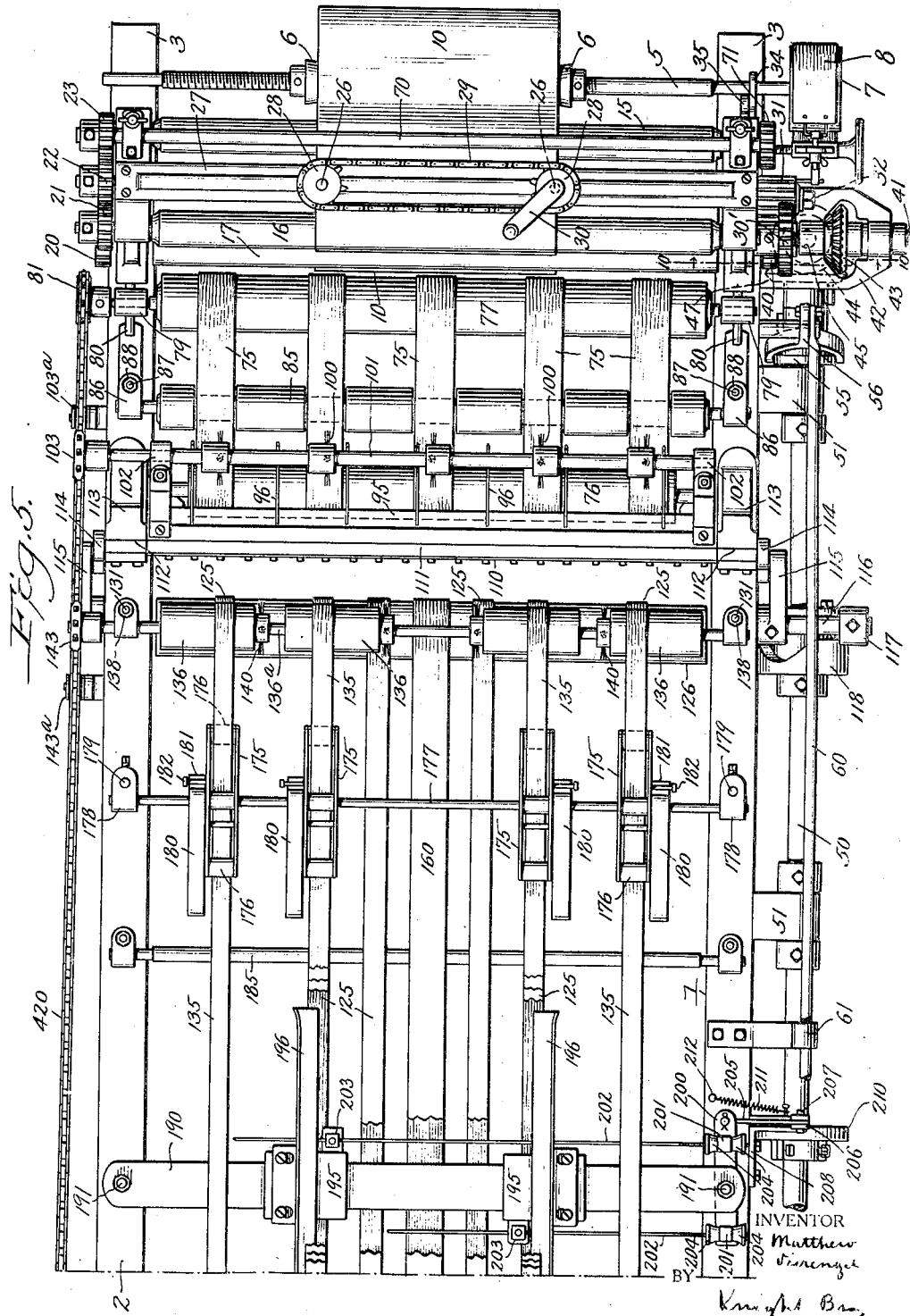

May 25, 1926.　1,586,055
M. VIERENGEL
MACHINE FOR CUTTING OUT BLANKS FOR ENVELOPES, ENVELOPE
BAGS, BAGS, FOLDING BOXES, ETC
Filed Nov. 23, 1923　9 Sheets-Sheet 6
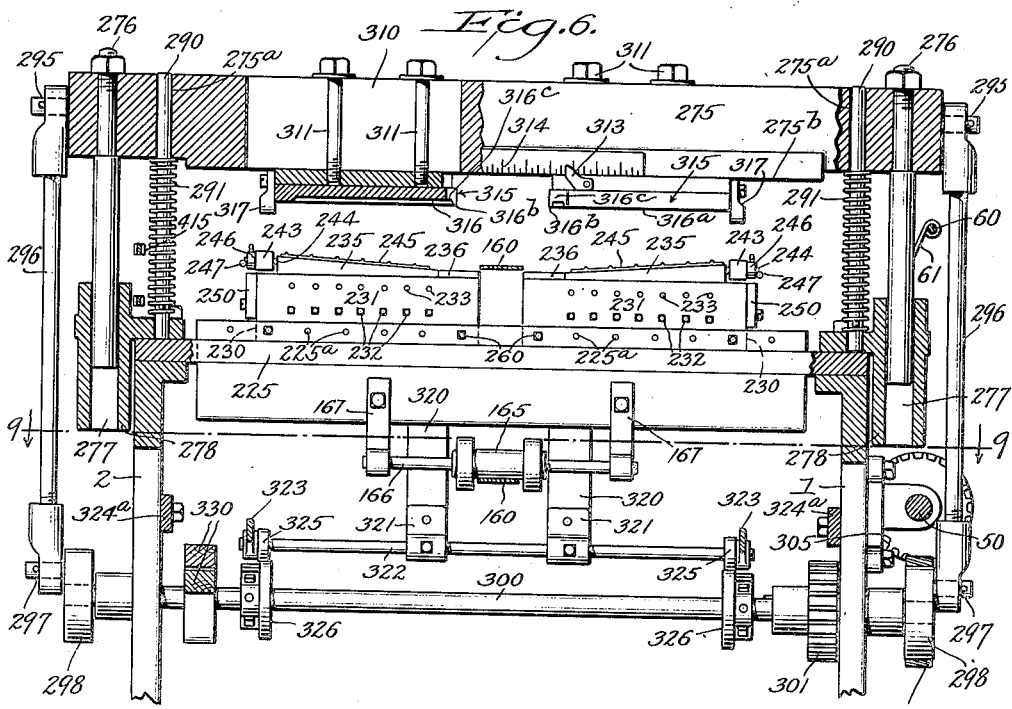
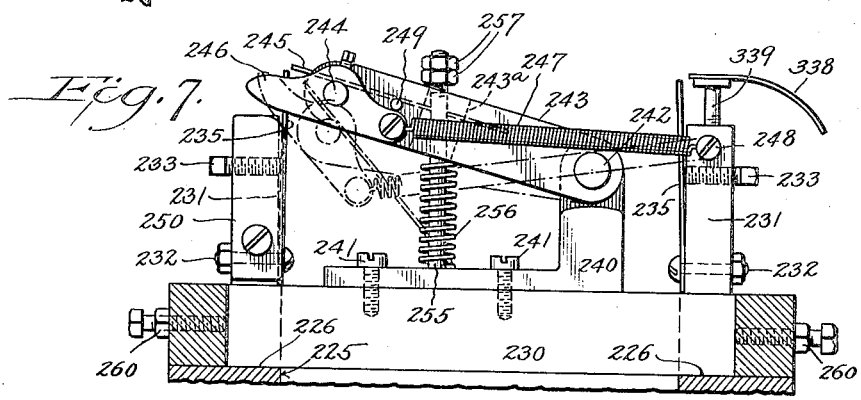
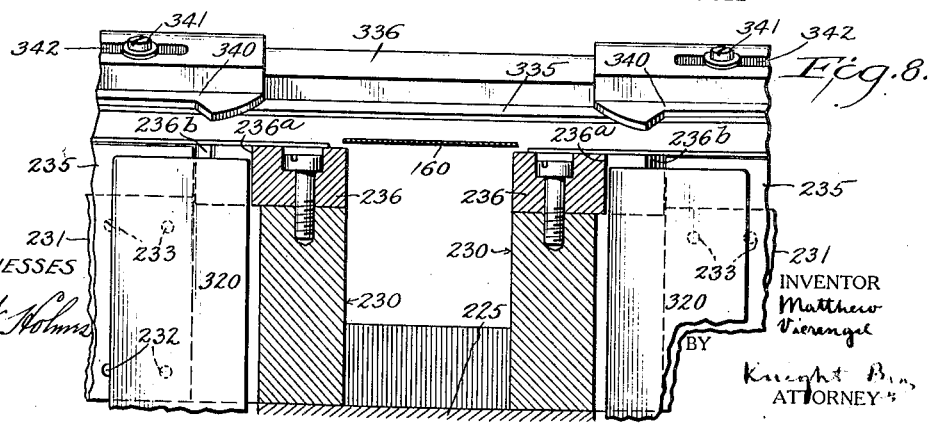

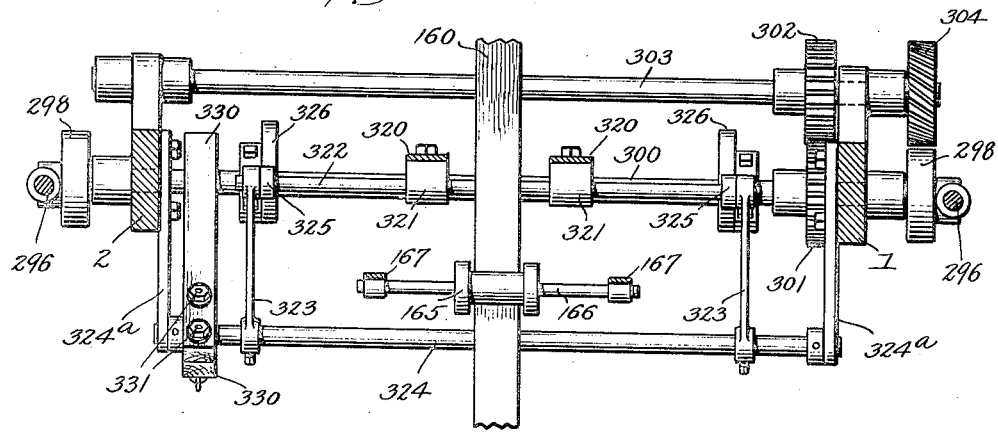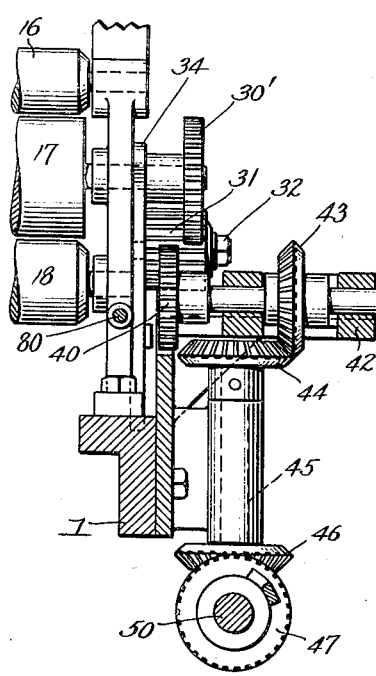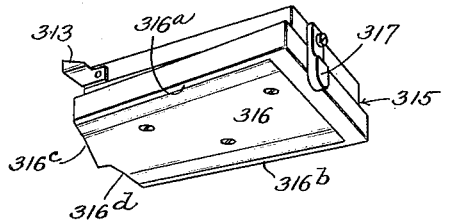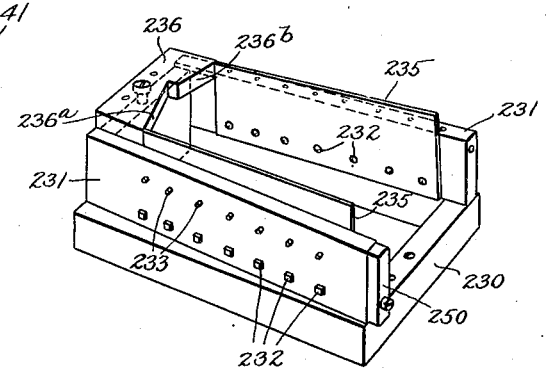

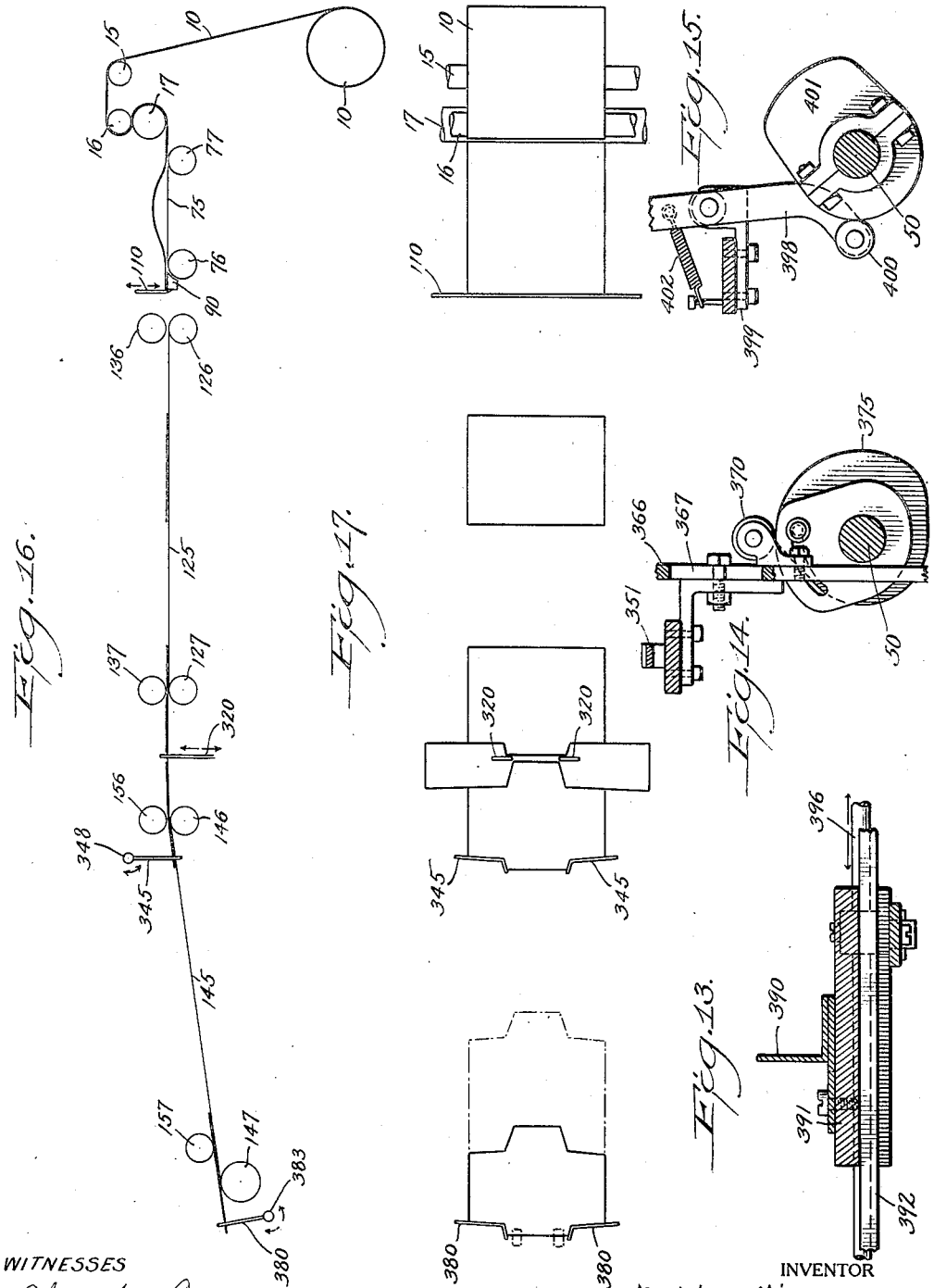

May 25, 1926. 1,586,055
M. VIERENGEL
MACHINE FOR CUTTING OUT BLANKS FOR ENVELOPES, ENVELOPE
BAGS, BAGS, FOLDING BOXES, ETC
Filed Nov. 23, 1923 9 Sheets-Sheet 9
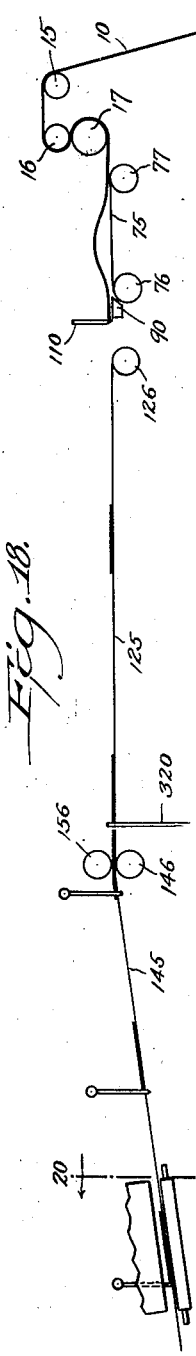
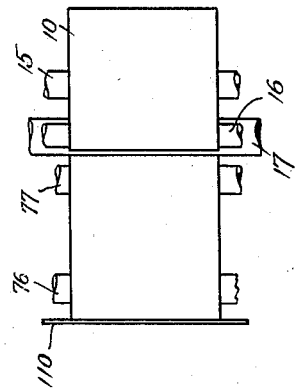
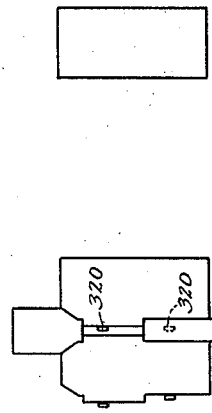
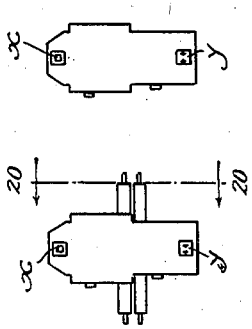
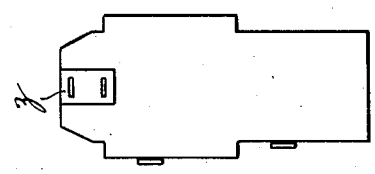
WITNESSES
INVENTOR
Matthew Vierengel
BY
Knight Bros
ATTORNEYS Patented May 25, 1926.

1,586,055

UNITED STATES PATENT OFFICE.

MATTHEW VIERENGEL, OF BROOKLYN, NEW YORK, ASSIGNOR TO M. VIERENGEL MACHINE CO., INC., OF BROOKLYN, NEW YORK, A CORPORATION OF NEW YORK.

MACHINE FOR CUTTING OUT BLANKS FOR ENVELOPES, ENVELOPE BAGS, BAGS, FOLDING BOXES, ETC.

Application filed November 23, 1923. Serial No. 676,551.

The present invention comprises in its broadest aspect means for feeding sheets, front and rear blank cutting dies mounted at fixed stations in the path of sheets, stops or gauges in a fixed station for positioning sheets for the operation of the front blank cutting dies and other front stops or gauges adjustably mounted in the path of sheets for positioning sheets for the action of the rear blank cutting dies. The adjustment of the stops or gauges with relation to the rear cutting dies determines the length or width of the completed blanks.

The front and rear dies may be shaped and arranged to cut blanks longitudinally from the intermittently fed sheets, with flaps at front and rear of the blanks,—or these dies may be shaped and arranged to form the blanks transversely of the fed sheets with the flaps extending laterally of the sheet path.

In the preferred embodiment of the present invention, paper stock is supplied from a continuous roll through the feeding mechanism which passes the web of paper to an intermittently operating knife, the feed of web being so timed with relation to the operation of the knife as to determine the length of paper sheets that are to be formed into blanks. The driving mechanism for the web feed includes change gear mechanism for regulating the speed of the feed with reference to the operation of the severing knife, so as to enable the operator to supply sheets of different lengths for different sizes of blanks. In the operation of the improved blank cutting machine equipped with the described web feeding mechanism, the operation of the web severing knife is properly timed with relation to the blank cutting dies to properly supply a succession of sheets to said dies. The web severing knife after each cutting action engages and arrests the leading edge of the continuous web, while the web feed continues to operate and thereby forms a buckle of surplus material in the rear of the knife until the knife is raised and permits the passage of the desired length of web for forming a sheet length. Each sheet length is arrested with its leading edge in position for the action of the front blank cutting dies after which the formed leading edge passes to the adjustable stops or gauges, which position the sheets for the action of the rear blank cutting dies. The completely cut blanks are passed out of the machine or delivered directly to a machine for making envelopes, envelope bags, bags or boxes.

The front edge cutting dies and back edge cutting dies are preferably combined at the same fixed station in the path of sheets, so that at each operation of the cutting dies the rear edge is formed upon one blank simultaneously with the cutting of the front edge upon the succeeding sheet. The dies are of sectional formation adjustable transversely of the sheet path to blank out different widths of sheets for forming various sizes of blanks.

The invention includes other minor features of novelty in addition to the above pointed out important principles, all of which will first be described with reference to the accompanying drawings and afterward more particularly pointed out in the annexed claims.

In said drawings:

Figure 1 is a side elevation of the improved machine for cutting out blanks.

Figure 2 is an enlarged vertical longitudinal sectional view of the rear portion of the machine.

Figure 3 is a similar view of the front portion of the machine.

Figures 2 and 3 taken together constitute a complete longitudinal sectional view of the machine.

Figure 4 is a plan view of the mechanism shown in Figure 2, the upper part of blanking out dies being broken away.

Figure 5 is a plan view of the mechanism shown in Figure 3.

Figures 4 and 5 taken together constitute a complete plan view of the machine.

Figure 6 is a vertical transverse sectional view taken on the line 6—6 of Figures 1 and 2.

Figure 7 is a detail vertical longitudinal sectional view taken on the line 7—7 of Figure 4.

Figure 8 is a detail vertical transverse sectional view taken on the line 8—8 of Figures 2 and 4.

Figure 9 is a detail transverse horizontal sectional view taken on the line 9—9 of Figures 2 and 6.

Figure 10 is a detail vertical transverse sectional view taken on the line 10—10 of Figures 1 and 5.

Figure 11 is a detail perspective view of one of the detached halves or sections of the adjustable upper composite die.

Figure 12 is a similar view of one half or section of the adjustable lower composite die, the chip supporting and ejecting device being omitted.

Figure 13 is a detail vertical transverse sectional view taken on the line 13—13 of Figure 4.

Figures 14 and 15 are detail vertical transverse sectional views taken on the lines 14—14 and 15—15, respectively, of Figure 4.

Figures 16 and 17 are diagrammatic views illustrating the progressive steps of the operation of the machine in forming envelope blanks from a continuous web of paper.

Figures 18 and 19 are similar views illustrating the steps in a modified operation of the machine in which the blanks are cut transversely of the sheets.

Figure 20 is a vertical transverse sectional view taken on line 20—20 of Figures 18 and 19.

Figure 21 is a detail diagrammatic view of a blank with modified closure device.

In the plan of the embodiment of the improved machine shown in the accompanying drawings, a suitable elongated framework is provided to support the web and sheet or blank feeding mechanisms and the cooperating knife, dies and registering stops or gauges, with a shaft extending longitudinally of the machine frame at one side geared to the web feeding mechanism and carrying cams for operating the intermittently acting mechanisms, and a sprocket chain or chains extending longitudinally of the frame at its outer side for driving the sheet and blank advancing conveyers. This plan of machine is, of course, not essential to the present invention, but has been found an effective and convenient arrangement of parts.

The main machine frame comprises two upright longitudinal side frames indicated at 1 and 2. These side frames are provided at one end with a rigid bracket arm 3 braced by the adjustable support 4. A roll supporting axle 5 is freely journalled at its ends in the bracket arms 3 and carries upon its threaded portion the adjustable cones 6, which engage the ends of the ordinary hollow mandrel of an endless roll of paper 10. By this mounting the roll of paper is rigidly held upon the axle 5 so as to rotate with it. One end of the axle 5 projects beyond the bearing bracket 3 and carries a brake pulley 7 encompassed by a brake band 8 controlled by any suitable device, such as shown for regulating the unwinding of the web from the roll.

Endless web 10 passes upwardly over feed rollers 15 and 16 and around the feeding drum 17 above the feed roller 18. These rollers 15, 16, 18 and drum 17 are all journalled in upward extensions of the side frames 1 and 2 and are geared together by a train of gears 20, 21, 22 and 23 to cause them to operate in unison.

An adjustable bar 25 engages the web 10 between the rollers 15 and 16. This bar 25 is suitably mounted upon the lower ends of adjusting screws 26, which are threaded in crossbar 27 of the machine frame and are provided at their upper ends with sprocket wheels 28 around which pass an endless sprocket chain 29 to cause screws 26 to rotate in unison. One of the screws 26 is also provided with a crank handle 30 by which bar 25 can be adjusted to press downwardly more or less upon the web 10 between the rollers 15 and 16, to remove the curl or natural set of the web as it feeds from the roll.

One feature of the present invention is the provision of adjustable change gear driving mechanism for the web feeding rollers just described, to enable the operator to feed more or less of the length of web in a given time to supply sheets of the desired length. This adjustable change gear driving mechanism comprises a spur gear 30' keyed to the projecting axle of feeding drum 17 in position to mesh with and be driven by a broad faced pinion 31, which is carried upon a stud 32 adjustably mounted in the slot 33 of supporting arm 34 pivoted upon the axle of drum 17. A slotted bracket 35 projects from the machine frame alongside of the pinion supporting arm 34. The slot in the bracket 35 is concentric with the axle of feed drum 17 and receives a clamping bolt 36 carried by arm 34 and provided with a clamping nut for securing the arm 34 in the desired adjusted position.

This broad pinion 31 also meshes with and is driven by a spur gear 40 mounted upon the inner end of a stub shaft 41 journalled in brackets 42 and carrying at its outer end a bevelled gear 43, meshing with a similar bevelled gear 44 on the upper end of a short shaft 45 journalled in a bracket secured to side frame 1. The shaft 45 carries at its lower end a bevelled gear 46 meshing with and driven by a bevelled gear 47 freely journalled upon a long shaft 50, which extends from end to end of the machine frame at one side and is suitably supported by bearing brackets 51. A sliding clutch member 55 is splined upon shaft 50 adjacent to the bevelled gear 47 and engaged by an operating lever 56 pivoted upon the machine frame 1, by which bevelled gear 47 may be clutched or released upon shaft 50. The clutch operating lever 56 is connected at its upper end with a rod 60 which passes through suitable supporting bracket arms 61 and extends to the opposite end of the machine where it is provided with an actuating handle 62. An adjustable collar 65 is clamped upon the rod 60 in position to engage one of the brackets 61 for limiting the clutch applying movement of rod 60. The handle 62 is also adjustably mounted upon rod 60 in position to engage bracket arm 61 for limiting the clutch releasing movement of rod 60.

The pinion 31 above referred to is adjustably mounted upon its supporting arm 34. It is proposed to provide a machine of the embodiment illustrated with a number of interchangeable pinions 31 graduated in size, so that by applying the proper pinion proportioned with relation to the rest of the gearing, any desired ratio of feed of web for the production of the selected sheet length can be obtained. The desirability of accurately cutting sheet lengths to suit the size of blanks to be made is not only because of economy of stock, but as will hereinafter appear for the most efficient cooperation with the composite die of the blanking out mechanism.

70 is a transverse shaft freely journalled in the upward extensions of the machine side frames above feed roller 15. This shaft 70 is geared through pinions 71, 72 with one end of the axle of feed shaft 15. The purpose of shaft 70 is to provide means for trimming the edge of the paper web as it is fed from the roller. The trimming cutter that may be applied to this shaft 70 is not shown, since the structure and mounting of such trimming cutters are well understood in the art and form no part of the present invention.

The end of web 10 passes from rollers 17, 18 on to the upper horizontal runs of the series of endless feed belts 75 operating around the belt rollers 76 and 77. The belt roller 76 is journalled in fixed bearings 78, while the belt roller 77 is journalled in the adjustable bearings 79 supported upon the guides 80, carried upon the machine frame. The axle of belt roller 77 projects beyond its bearing at one side of the machine and carries a sprocket wheel 81 by which the series of belts 75 are constantly driven. A belt tightening roller 85 formed with a series of deep annular grooves engages the lower runs of belts 75. This belt tightening roller 85 is journalled at its ends in bearing brackets 86 adjustably carried upon upright screws 87, which project from the machine side frames and are provided with adjusting nuts 88 to effect the raising and lowering of the roller 85 to tighten or loosen the belts 75.

The conveying belts 75 carry the web 10 forwardly over the lower stationary knife plate or member 90. Spaced above the knife plate 90 is a curved guide plate 95 forming with the knife plate 90 a gradually contracting throat for leading the web 10 to the cut-off knife and confining it adjacent to the path of the knife during the operation of cutting off a sheet. A series of guide rods or fingers 96 project rearwardly from the guide plate 95 to assist in guiding the web and confining it in the rear of the knife. A series of rotary brushes 100 are mounted upon the shaft 101 above the plane of feed of the web in position to engage the web and keep it brushed up to the plane of action of the cut-off knife and restrict the bulge or buckle of surplus web material to a position in rear of the brushes, so as not to interfere with the accurate action of the cut-off knife. The brush carrying shaft 101 is journalled in bearing brackets 102 projecting rearwardly from the guide plate 95, said shaft being extended at one side to receive the sprocket wheel 103, which is driven by the sprocket chain hereinafter referred to.

110 is a vertically reciprocating cut-off knife mounted upon the crosshead 111 mounted in the vertical guideways 112, formed in the upwardly presented brackets 113 mounted upon the machine side frames. The knife crosshead 111 has pivoted to its opposite end the downwardly extending links 114 pivotally connected at their lower ends to the rock arms 115 adjustably mounted upon a rock shaft 116, which extends from side to side of the machine and is suitably journalled in the machine side frames. This rock shaft 116 carries at one end a rock arm 117 which operates in a grooved cam 118 mounted upon the shaft 50 above referred to. The cam 118 causes the knife 110 to operate once for each revolution of the shaft 50.

The knife 110 is normally at rest in elevated position to permit the passage of the leading edge of web 10 over bed plate 90 and under knife 110, the web passing beyond the vertical plane of action of the knife on to the upper runs of a second series of endless conveyer belts 125 operating upon the belt rollers 126 and 127, which are mounted respectively in the vertically adjustable bearing brackets 130 adjustably supported from the machine upon the upright screws 131 by means of nuts 132.

Upper endless conveyer belts 135 are mounted upon the belt rollers 136, 137 in cooperative relation with the lower conveyer belts 125 and serve to engage sheets and press them against the lower belts for insuring accuracy in the feeding operation. The belt rollers 136, 137 are adjustably mounted upon the upper ends of the screws 131 above referred to and are confined thereon in the desire adjusted positions by means of nuts 138 threaded upon said screws above and below the bracket bearings in which the belt rollers are journalled. The belt rollers 136 and 137 are formed of cylindrical sections and their shafts 136$^a$ and 137$^a$ have mounted upon them between the roller sections the rotary brushes 140, which engage sheets above the lower belts rollers 126 and 127 to assist in the feeding operation. The shafts of belt rollers 127 and 136 project at one side of the machine and have mounted thereon the sprocket wheels 141, 142 and 143, which engage the sprocket chains hereinafter referred to for imparting continuous motion to the belt rollers, belts and brushes.
A third series of lower endless conveying belts 145 is mounted upon belt rollers 146, 147, adjustably supported upon the machine frame in the same manner as the supporting rollers of the other conveying belts just described. This third series of endless belts 145 is separated from the second series 125 by a sufficient space to permit the mounting of the flap forming dies to which sheets are delivered by conveyer 125 and from which they are carried away by conveyer 145. These flap forming dies will be hereinafter described.

A second set of upper endless belts 155 is mounted above the conveyer belts 145 upon belt rollers 156, 157 carrying rotary brushes 158 between the cylindrical roller sections and mounted in adjustable bearing brackets 159 carried upon the upright screws 131 projecting up from the machine side frame in the manner already explained. The belts rollers 147 and 156 are provided with sprocket wheels 149 and 150 for the engagement of the driving sprocket chain hereinafter referred to.
In addition to the two sets of endless conveyers 125, 145, there is a long wide conveyer belt 160 passing centrally through the machine over the belt rollers 126, 127, 146 and 147 and back under a guide pulley 165 to the first mentioned belt roller 126. The guide pulley 165, shown best in Figures 2 and 6 of the drawings, is mounted upon a shaft 166 carried by the depending bracket arms 167 secured to one of the transverse frame bars of the machine. This belt 160 acting mainly as a conveyer, also assists in driving the other conveyer belts hereinbefore described.

The lower runs of the endless conveyer belts 125 and 145 and the upper runs of the upper endless belts 135 and 155 are engaged between their supporting belt rollers by some suitable from of slack take-up or belt tightening device. In the accompanying drawings four series of one form of such belt tightener is shown applied to these endless belts. A description of one of these devices will be sufficient for all, since the structure is identical in the several devices.

Each of these belt tightening devices referred to comprises a lever 175 having journalled in its opposite ends the rollers 176, which respectively engage the upper and lower faces of one of the endless belts. These levers 175 are pivotally mounted upon a transverse rod 177 carried at its ends upon brackets 178 adjustably mounted upon upright posts 179 projecting from the machine side frames. A weighted lever arm 180 is pivoted upon the rod 177 alongside of the belt tightening lever 175 and is formed with a rearwardly projecting heel 181, which engages a pin 182 projecting laterally from the lever 175; thereby giving said belt tightening lever a normal tendency to take up the slack and tighten the endless belt upon which it is applied, the belt engaging rollers 176 pressing upwardly upon the belt at one side of pivot 177 and downwardly upon the belt upon the opposite side of pivot 177 to accomplish this purpose.

It will be observed that there is an individual and independent belt tightening device for each endless belt, and that further the several belt tightening devices for each set of endless belts are mounted upon a common supporting pivot rod 177.

It will also be observed that in Figure 5 of the drawings, the machine is shown with six lower conveyer belts 125, and four upper belts 135, and in Figure 4 with eight lower belts 145 and four upper belts 155. The number and arrangement of these belts can be arranged to suit the particular size of sheets and character of stock operated upon.

185 is an idler belt roller supported beneath the upper runs of endless belts 125 and feed belt 160. said roller 185 being adjustably supported at its ends in the same manner in which the other belt supporting rollers are mounted.

Immediately below the plane of feed of sheets adjacent to belt roller 127 is mounted a track bar 190 adjustably supported at its ends upon the upright pins or studs 191 projecting from the machine side frame. Slide blocks or carriages 195 are mounted upon the track bar 190 with freedom to reciprocate inwardly and outwardly transversely of the machine, each of said members 195 having removably mounted upon it a flanged side gauge 196. The track bar 190 is mounted beneath the horizontal plane of feed of the conveyer belts 125 and 160 to present the horizontal portions of the gauges 196 beneath the plane of feed and the vertically and longitudinally presented side gauging flanges intersecting the plane of feed, so as to engage the edges of passing sheets and accurately guide them into the proper longitudinal path to present them to the flap cutting dies hereinafter explained. These side registering gauges 196 have their horizontal and vertical walls flared respectively downwardly and outwardly to facilitate the entry of sheets between the gauges.

At one side of the machine an operating lever 200 is pivoted upon the supporting pin or stud 191 and carries at opposite sides of its pivot the upwardly presented blocks 201 through which project the threaded ends of the rods 202, projecting from the pivoted blocks 203 mounted upon lugs of the reciprocating carriages 195. The threaded ends of these rods 202 are engaged by the screw nuts 204 presented at opposite faces of blocks 201 to afford adjustable connections between the rocking lever 200 and the reciprocating carriages which support the gauges 196.

The lever 200 is connected through a link 205 with a lever 206 pivoted at 207 upon a bracket arm 208 secured to the machine side frame. Lever 206 carries at its lower end an antifriction roller (not shown) which operates upon the periphery of a cam 210 secured to the shaft 50 above referred to. A spring 211 connects lever 206 above its pivot with a pin or lug 212 upon the machine side frame. The described mechanism causes the side registering gauges 196 to intermittently move toward and away from each other for accurately positioning a passing sheet in the central zone of the machine, preparatory to its presentation to the flap cutting dies which will now be described.

The dies for blanking out the front and rear edges of sheets may be separate devices brought into action at proper times, but these dies are preferably formed as in the embodiment illustrated in the accompanying drawings, in which they are arranged to simultaneously cut out the leading edge of one sheet and the rear edge of a preceding sheet, separate gauges being provided for independently positioning the two sheets with respect to the front and rear die portions. In addition to the preferred composite form of blanking out dies, it is also desirable to form these composite dies of independently adjustable parts or members, which are separated in the central longitudinal zone of the machine so that the parts or sections can be adjusted inwardly and outwardly toward and away from each other to effect the required lateral spacing of the dies to produce envelope or other blanks of different sizes.

Arranged transversely of the machine between the belt rollers 127 and 146 is mounted an open oblong bed frame 225, which rests upon the machine side frames and is securely bolted thereto. This open bed frame 225 is formed with inwardly presented shoulders or ledges 226 upon which rest the two lower members 230 of the composite die. Each of these lower die members 230 comprises an open rectangular base having upright walls 231 projecting from it. Secured to these walls 231 by means of set screws 232 are the knife blades 235 which are engaged above the lines of their attachment to walls 231 by a series of adjusting screws 233, which pass through the walls 231 into engagement with the blades 235 for the purpose of accurately presenting said blades in cutting relation to the upper composite die sections presently to be described. At the inner end of each lower die member 230 is mounted a cutting plate 236 formed with cutting edges 236$^a$, 236$^b$ presented at angles to the cutting blades 235 referred to.

At the outer edge of each lower die member 230 is mounted an angular bracket 240 secured by means of set screws 241, upon which bracket is pivotally mounted at 242 a lever 243 which has pivotally mounted in its free end a short rock shaft 244, on which is mounted a chip ejecting plate 245 which normally rests in slightly inclined position directly in the rear of one of the cutter blades 235. This rock shaft 244 of the chip ejector carries at its outer end a cam faced trip member 246 engaged by spring 247 which connects with a stationary point 248 to hold the trip member 246 in engagement with a stop pin 249 projecting laterally from the lever 243. This trip member 246 is presented normally above a block 250 bolted to the outer end of one of the walls 231, so that the downward movement of lever 243 will cause member 246 to engage block 250 and rock the shaft 244 against the restraint of spring 247 with the result that the chip ejecting plate 245 will be shifted from its normal position to a more abrupt inclination as shown in Figure 7 of the drawings, to cause a chip of paper to slide from the plate down into the opening in the die supporting bed frame. The lever 243 is formed with an opening 243$^a$ extending through it and a guide bolt 255 projects upwardly from the bracket 240 through said opening 243$^a$, an expansion spring 256 being confined upon the bolt 255 between bracket 240 and lever 243 for yieldingly supporting the lever 243 in its raised position. Nuts 257 are threaded upon the upper end of bolt 255 for limiting the upward movement of lever 243 and for accurately adjusting the normal position of said lever to produce the desired cooperation of the chip ejecting plate and the blanking out dies.

These lower composite die members 230 are secured in the desired position in the open bed frame 225 by means of bolts 260, which pass through any of the series of openings 225ª in the upright walls of frame 225 and impinge against the sides of the die members 230. By this means the two lower die members 230 can be readily adjusted inwardly and outwardly upon their supporting bed frame. In Figure 12 of the drawings one of these lower composite die members 230 is illustrated separated from the rest of the machine and with the chip ejecting device removed. It will be understood that the composite die members described include the lower parts of a composite die for cutting both the leading edge of one sheet and the rear edge of a preceding sheet. The cooperating composite upper die members will now be described.

275 is a crosshead provided with downwardly projecting guide pins 276 which reciprocate freely in the vertical sockets 277 of the guide brackets 278 securely bolted to the machine frame at opposite ends of the bed frame 225 above referred to. Guide pins 290 project upwardly from the brackets 278 and pass freely through vertical openings 275ª in the crosshead 275, cushion springs 291 being mounted upon the pins 290 between brackets 278 and the crosshead 275. The opposite ends of crosshead 275 are provided with bearing pins 295, upon which are pivoted the upper ends of pitman 296 connected at their lower ends to crank pins 297 upon crank disks 298, which are carried by a transverse shaft 300 freely journalled in the machine frames. This shaft 300 is provided inside of one of the side frames with a spur gear 301 which meshes with a similar gear 302 upon a transverse shaft 303 journalled in brackets formed upon the machine side frames. This shaft 303 carries at its outer end a worm gear 304 which meshes with and is driven by a similar worm gear 305 keyed to the machine shaft 50 above referred to. By the described mechanism the crosshead 275 is caused to reciprocate vertically upon its guides.

This crosshead 275 is formed with two vertical slots 310 arranged upon opposite sides of the central vertical longitudinal plane of the machine to receive the screw bolts 311, which are threaded into the upper composite die members 315 and support them in the desired adjusted position upon the crosshead. A suitable gauging scale 314 is mounted upon one face of the crosshead 275 and indicator fingers 313 are mounted upon the adjustable upper die members 315 to indicate at a glance the desired position for the die members for the particular size of envelope or box blank to be made.

The crosshead 275 is formed with a timed under surface indicated at 275ᵇ to engage the upper surfaces of the die members 315.

For cooperating with the composite lower die members above described, these upper die members are constructed as illustrated in detail in Figure 11 of the drawings, in which the block or carrying member 315 has secured to its under face a cutting plate 316 formed with main cutting edges 316ª and 316ᵇ designed to cooperate with the cutting blades 235 of a lower die member and the angular cutting edges 316ᶜ and 316ᵈ, which cooperate with the cutting edges 236ª and 236ᵇ of the lower die member. Each upper die member 315 carries a downwardly presented tappet member 317 which is presented in position to engage one of the levers 243 of the chip ejector of the lower member, causing the lowering of lever 243 when the upper die member moves downwardly during a blanking out operation.

320 are vertically presented gauge plates or stops mounted at their lower ends upon blocks 321 which are journalled upon a transverse shaft 322 carried in the free ends of rock arms 323 adjustably secured to a rock shaft 324. The rock shaft 324 is journalled at its ends in the bracket arms 324ª projecting from the machine side frames. The shaft 322 carries near its opposite ends antifriction rollers 325, which operate in peripheral engagement with the cams 326 mounted upon the shaft 300 above referred to.

It is desired to have the gauge or stop plates 320 remain in elevated gauging position until the descent of the upper die members. This result can be accomplished by the accurate timing of the operating cams 326, but I have found a simple and effective means for the purpose to be the provision of a suitable braking device for the rock shaft 324, so that the gauge members will be raised by the cams and remain in elevated position until they are pushed back by the action of the blanking out dies. In the form of this mechanism shown in the drawings, it will be observed with particular reference to Figures 2 and 9 that two strips of wood 330 are notched upon their inner faces to fit over the shafts 300 and 324, clamping bolts 331 passing through the strips 330 upon opposite sides of the shaft 324 to clamp them upon said shaft with more or less pressure to produce the desired frictional engagement with the shafts. The stop gauges 320 are provided with guide pins 320ª which project from them and guide upon the inner face of one of the transverse frame bars to guide and brace said stops.

The stops 320 are presented up through the hollow lower die members in the path of sheets to engage the leading edge of a sheet and arrest it in position for the blanking out of said leading edge.

Sheets are directed from the conveyer belts 125 to the blanking out dies by upper and lower guide members forming a vertically contracted throat. 335 is the upper inclined guide plate mounted upon a transverse bar 336 secured at its ends upon the brackets 337 projecting from the bracket bearings of the upper belt roller 137. 338, 338 are the centrally spaced lower guide plate sections, mounted upon screws 339 projecting upwardly from the composite lower die members 330 and adjustable transversely of the machine with said die members.

340 are stripper members, each having angular forwardly presented faces shaped to approximately conform to the cutting edges 235, 236$^b$ of a lower die member and the cooperating cutting edges 316$^b$ and 316$^d$ of an upper die member. The upper die members move vertically past the stripper members, which latter confine the blanked out sheets in the plane of feed and strip them from the upper die members after a cut. These stripper members 340 (of which there are two spaced laterally on the machine), are formed of channeled plates fitting upon the upper surface of transverse bar 336, said bar being formed with a number of vertically presented threaded perforations 336$^a$ to receive clamping screws or bolts 341 which pass through elongated slots 342 in the channeled portions of the stripper members and engage in certain of said perforations for securely fastening the stripper members to bars 336. By this means the stripper members 340 can be conveniently adjusted transversely of the machine to suit the adjusted position of the composite die members.

After each operation of the blanking out dies the sheets are carried forward by the constantly running belt 160, one sheet being arrested by the gauges 320 as already explained, and the blanked out leading edge of the preceding sheet being arrested by the gauges 345, shaped as shown specifically in Figure 17 of the drawings to engage the leading angular face of the partially formed blank. These gauges 345 are mounted upon the lower ends of arms 346 formed with laterally extended steadying sleeves 347, which are adjustably mounted upon the rock shaft 348 and are secured thereto by thumb screws 349. The gauges 345 are adjusted laterally of the machine upon shaft 348 to accurately engage the leading blanked out edge of a sheet. The rock shaft 348 is freely journalled in the upper ends of brackets or auxiliary side frames 350, which are designed to slide forwardly and backwardly upon the rack bars 351 suitably secured to extensions of the machine side frames. These bracket frames 350 have freely journalled in them, just above the rack bars 351, a transverse shaft 352 carrying near its opposite end pinions 353, which mesh with the rack bars 351, said shaft 352 also having at one end a hand-wheel 355 by which shaft 352 may be rotated to cause the gauge carrying brackets to be shifted forwardly and backwardly to position the gauges at the proper distance from the blanking out dies to shape the rear edge of a sheet for the desired length of envelope or box blank. The brackets 350 also have rearwardly presented arms 350$^a$ carrying a transverse tie rod 356 on which are adjustably mounted the fixed side gauges 357, which are designed to engage a moving sheet to accurately present it to the stop gauges 345 above referred to. These side gauges 357 are presented upon opposite sides of the path of sheets, their position being accurately located to suit the particular size of sheet being operated upon.

The gauge supporting rock shaft 348 carries at one end a rock arm 360 provided with an antifriction roller 361 and held by spring 362 in constant engagement with a vertically reciprocating cam bar 365. This cam bar 365 is mounted on the upper end of a vertical bar 366 formed with elongated slots 367, 368, through which pass the guide bolts 369 seated in suitable brackets upon the machine frame for accurately supporting and guiding the bar 366 in its vertical reciprocation. This bar 366 also carries an antifriction roller 370, which operates in peripheral contact with a cam 375 secured to the shaft 50 above referred to. This cam 375 is preferably of sectional formation to facilitate the timing of the operation of the cam bar 365. By the described arrangement of operating mechanism for the stop gauges 345, it will be observed that the gauges can be readily adjusted for various sized sheets without the necessity of changing the operating mechanism, the roller 361 of rock arm 360 moving freely upon cam bar 365 when the gauges are adjusted and always remaining in operative relation to the cam bar.

The gauges 345 arrest sheets in position to present their rear edges to the action of the rear edge blanking out parts of the composite dies. Immediately after the action of the dies, the gauges 345 are rocked out of the path of the sheets to permit the conveyer belts to pass the completed blanks to the final set of gauging sheet stops at the delivery end of the machine. These final sheet stops 380, shown in detail in Figure 17 of the drawings, are the same shape as the stops 345 just referred to, so as to accurately engage the leading edge of the blank. Stop plates 380 are adjustably mounted upon the rod 381 supported between the upper ends of arms 382 carried by a rock shaft 383 suitably journalled in extension brackets of the machine side frames and carrying at one end a rock arm 384 operating in engagement with a cam 385 upon shaft 50. A spring 386 holds the rock arm 384 in operative relation to cam 385.

Just prior to the arrival of the blanks at the final stops 380, they are preferably given a final side registering adjustment by means of the angular side registering plates 390, removably mounted upon the reciprocating blocks 391 operating upon a transverse bar 392 secured to the machine side frames. These reciprocating blocks 391 are intermittently operated toward and from each other, for positioning a blank upon the conveyer, by means of a pivoted lever 395 adjustably connected upon opposite sides of its pivot through rods 396 with the respective guiding blocks 391 in the same manner as above described with reference to the side registering plates 196. The lever 395 is connected through link 397 with a vertical lever 398 pivoted to a machine bracket 399 and carrying at its lower end an antifriction roller 400 operating upon a cam 401 mounted on shaft 50. A spring 402 holds the lever 398 against the cam 401.

Completed blanks may be delivered from the machine to a pile, or they may be taken directly from the improved blanking out machine by an envelope or box machine for forming the blanks into completed articles. The machine for operating upon the complete blanks forms no part of the present invention, but parts of an envelope machine of the type covered by my Patent No. 1,000,057 of August 8th, 1911, are illustrated in Figures 1 and 2 of the drawings. In these illustrations 405 is a gripper cylinder designed to take successive blanks from the gauging final stops 380 and pass them to the envelope machine.

In the embodiment of the invention illustrated in the accompanying drawings, the shaft 50 is intended to be driven from the envelope machine as well as the chain drive for the conveyers which will now be referred to more in detail. A train of gears 410, 411 and 412, shown as driven from the gripper cylinder 405 of the envelope machine, directly drive the large belt roller 147 at the delivery end of the machine. As above explained the axle of this belt roller 147 carries a sprocket wheel 149, which drives a sprocket chain 415 operating around the sprocket wheel 141 upon lower belt roller 127, said chain passing beneath and in engagement with the sprocket wheel 150 of the upper belt roller 156. Guide pulley 150ª supports chain 415 adjacent to sprocket wheel 150. A second sprocket chain 420 passes around the second sprocket wheel 142 of lower belt roller 127 to the sprocket wheel 81 on belt roller 77, the upper run of said chain passing beneath and engaging the sprocket wheels 103 and 143 above referred to. Guide pulleys 103ª and 143ª engage the chain 420 adjacent to sprocket wheels 103 and 143 respectively. By this means all of the conveyer belts, the pressure belts and rotary brushes are driven from a part of the envelope machine.

Figures 16 and 17 of the drawings illustrate the successive steps of forming blanks from a continuously fed paper web. In these illustrations, it will be observed that the front and rear flaps of the envelope blanks are cut longitudinally of the machine or of the path of the sheet material. In Figures 18 to 21 several slight modifications of the method of operating the new machine are illustrated. In these modifications the blanks are formed transversely of a longitudinal traveling web, that is the sheets are blanked out with their flaps extending transversely of the sheet path and the sheets and blanks progress sidewise through the machine.

In the operation of the improved blanking out machine, the web of paper is fed continuously to the cutting off knife 110 at the proper speed with relation to the timed operation of the knife, to insure the cutting off of sheets of the exact length of the blanks to be formed. As previously explained this speed relationship is obtained by the use of the proper changeable gear in the drive chain for the web feed. While the knife is down in the act of cutting off a sheet, the web is buckled slightly against the knife, but immediately straightens out and progresses beneath the knife when the latter is raised.

The front and rear edges of the completed blanks are coincident with the front and rear edges of the sheets carried forward by the conveyer from the cut off knife 110. The successive sheets are arrested by the gauges 320, next by the gauges 345 and finally by the gauges 380. At each operation of the blanking out dies in their fixed station in the sheet path, the leading edge of one sheet is cut out simultaneously with the rear edge of the preceding sheet, it being clear with particular reference to Figure 17 of the drawings, that two sheets are gauged in successive positions with relation to the composite dies prior to every operation of the dies.

The sheet guiding and chip ejecting plates 245 rest normally in position to guide the side edges of the advancing sheet over the rear flap cutting blades of lower die members, the central portion of the sheet resting upon belt 160. Immediately following the cutting action of the dies, the levers 243 of lower die members are engaged by tappet members 317 of the upper die members to cause the rocking of ejecting plates 245 for ejecting the chips.

It will be clear that blanks of different widths can be formed by using different widths of web from which different lengths of sheets can be cut, which are blanked out with the proper sizes of front and rear flaps by proper adjustment of the composite dies transversely of the machine and the adjustment of the gauges 345 longitudinally and transversely.

In the use of the machine for forming blanks with their flaps extending transversely of the web or the sheet path, as shown in Figures 18, 19 and 20, it will be understood that the only changes necessary are the mounting of blanking out dies of the proper design and the arrangement and adjustment of the gauges to suit the changed form and manner of handling the blanks. In this modified form of the machine, an additional set of stops is shown to illustrate the mounting of suitable reinforcing patches and closure devices upon the blanks prior to the formation of the envelopes. For instance, in Figure 19 of the drawings, a blank is shown with a reinforced perforation at $x$ to receive one of the well known fastening devices shown at $y$. In Figures 18, 19 and 20 the elements of a folding mechanism are illustrated to show the application of a different form of envelope machine to the continuous blanking out machine of the present invention. Figure 21 is a diagrammatic view of an envelope blank of the form shown in Figure 19 having the illustration at $z$ of a different form of reinforcing closure device. These forms of blanks, both with and without reinforcement patches and closure devices, are well known in the art and are not specifically claimed in the present application, but are shown diagrammatically in the drawings simply as illustrations of possible extensions in the uses of the improved machine. It will be observed that in any of the suggested forms of the machine, the main operating devices, such as the cut-off knife, the blanking out dies, the patch and closure applying devices and the attached envelope machine are all mounted at fixed stations in the web path of the machine and that such devices always remain in said stations irrespective of the sizes of blanks being produced. The differences in sizes are provided for by the simple adjustments explained which do not require alternation of the devices which operate upon the sheets for determining the character of the blanks.

One of the important advantages of the improved blanking out machine resides in the simplicity of construction and the readiness with which the machine can be adjusted for producing different sizes of envelope blanks. The blanking out dies being mounted at a fixed station in the sheet path with the first set of stops always operating in the same station, it will be clear that to change the machine to produce a desired size of blank, it is only necessary to correct the speed of the web feed by the means set forth to produce the proper length of sheets, then adjust the second set of stop gauges to accurately correspond with the length of sheets and transversely adjust the composite die members to form the required flaps upon the sheets. The side registering gauges and final stop gauges can then be transversely adjusted to suit the width of flaps upon the blanks to be formed. These adjusting operations are much more readily and accurately performed than the shifting and adjusting of the punches and dies and other devices for producing blanks of different sizes and character as has been the practice heretofore. With the improved machine the length of the blank or sheet is first determined and the blank completed by cutting away certain portions from the corners of the sheet. In the past the usual practice has been to determine the size of the blanks by the adjusted relationship between two sets of punches and dies which operate upon continuous webs or sheets in excess of the desired blank sizes.

I claim:

1. In a machine of the character set forth, the combination with means for feeding sheets in a given path, of a composite blanking out die operating in the sheet path adapted to cut out adjacent edges of two sheets.

2. In a machine of the character set forth, the combination with means for feeding sheets in succession in a given path, of a composite blanking out die operating in the sheet path and adapted to simultaneously cut out the adjacent edges of two succeeding sheets.

3. In a machine of the character set forth, the combination with means for conveying sheets, of front and rear blanking out dies mounted at fixed stations in the sheet path, and stop gauges for arresting sheets in said blanking out die stations.

4. In a machine of the character set forth, the combination with means for conveying sheets, of front and rear blanking out dies mounted at fixed stations in the sheet path, and two sets of stop gauges for arresting sheets, one set of said gauges being adjustable in the sheet path.

5. In a machine of the character set forth, the combination with means for conveying successive sheets, of front and rear blanking out dies mounted in fixed stations in the sheet path, stop gauges for arresting sheets in said blanking out die stations, and means for operating said front and rear dies for simultaneously blanking out the leading edge of one sheet and the rear edge of a preceding sheet.

6. The combination with the front and rear flap cutting dies arranged in a fixed station in the path of sheets, stops at said fixed station in the sheet path, stops adjustable in the sheet path, and means for feeding sheets.

7. In a machine of the character set forth, the combination with means for conveying sheets, of composite front and rear blanking out dies mounted at a fixed station in the sheet path, and stop gauges for arresting successive sheets in two positions at said blanking out die station.

8. In a machine of the character set forth, the combination with means for conveying sheets, of composite front and rear blanking out dies mounted at a fixed station in the sheet path, and two sets of stop gauges for arresting successive sheets in two positions, one set of said gauges being adjustable in the sheet path.

9. In a machine of the character set forth, the combination with means for conveying successive sheets, of composite front and rear blanking out dies mounted in a fixed station in the sheet path, stop gauges for arresting sheets in two positions at said blanking out die station, and means for operating said composite dies for simultaneously blanking out the leading edge of one sheet and the rear edge of a preceding sheet.

10. In a machine of the character set forth, the combination with means for conveying sheets, of front and rear blanking out dies mounted at fixed stations in the sheet path, and stop gauges mounted at a fixed station for arresting sheets in said front blanking out die station, and stop gauges adjustable in the sheet path for arresting sheets in said rear blanking out station.

11. In a machine of the character set forth, the combination with means for continuously feeding a web, of periodically operating cut-off mechanism for cutting sheets from said web, means for conveying successive cut sheets, front and rear blanking out dies operating at fixed stations in the sheet path, and stop gauges for arresting the sheets in the blanking out stations.

12. In a machine of the character set forth, the combination with means for continuously feeding a web, of periodically operating cut-off mechanism for cutting sheets from said web, means for conveying successive cut sheets, composite front and rear blanking out dies operating at a fixed station in the sheet path, and stop gauges for arresting successive sheets in two positions at the blanking out station.

13. In a machine of the character set forth, the combination of means for continuously feeding a web, an intermittently operating cut-off mechanism, means for feeding severed sheets from the cut-off mechanism, a blanking out die mounted at a fixed station in the sheet path, stops arresting sheets at said blanking out die station, a second blanking out die, and stops arresting sheets for said second blanking out die.

14. In a machine of the character set forth, the combination with means for feeding sheet lengths in a given path, blanking out dies for the front and rear edges of sheets mounted in a fixed blanking out station in the sheet path, sheet stops in a fixed station in the sheet path for arresting sheets for the front edge blanking out dies, and sheet stops adjustable in the sheet path for arresting sheets for the rear edge blanking out dies.

15. In a machine of the character set forth, the combination with means for continuously feeding a web, means for periodically cutting sheet lengths from the web, means for feeding cut sheets in a given path, blanking out dies operating in a fixed station in the sheet path, and means for positioning two successive sheets in two positions at said blanking out station, whereby the leading edge of one sheet and the rear edge of the preceding sheet will be simultaneously blanked out.

16. In a machine of the character set forth, the combination with means for continuously feeding a web, means for periodically cutting sheet lengths from the web, including change speed gear driving mechanism for determining sheet lengths, means for feeding cut sheets in a given path, blanking out dies operating in a fixed station in the sheet path, and means for positioning two successive sheets in two positions at said blanking out station, whereby the leading edge of one sheet and the rear edge of the preceding sheet will be simultaneously blanked out.

17. In a machine of the character set forth, the combination with means for continuously feeding a web, means for periodically cutting sheet lengths from the web, means for controlling the speed of said web feeding means with relation to said cut-off mechanism to determine sheet lengths, means for feeding cut sheets in a given path, blanking out dies operating in a fixed station in the sheet path, and means for positioning two sucessive sheets in two positions at said blanking out station, whereby the leading edge of one sheet and the rear edge of the preceding sheet will be simultaneously blanked out.

18. In a machine of the character described, the combination with means for conveying sheets in a given path, of a blanking out die comprising cooperating upper and lower sectional members which are relatively adjustable transversely of the sheet path.

19. In a machine of the character described, the combination with means for conveying sheets in a given path, of a blanking out die comprising cooperating upper and lower sectional members which are relatively adjustable transversely of the sheet path, a fixed scale, and an indicator on one of said adjustable members registering with said scale.

20. In a machine of the character described, the combination with means for conveying sheets in a given path, of a reciprocating blanking out die, a sheet stop in said sheet path in position for engagement and operation by said die, a movable support for said sheet stop, a friction device for acting upon said support, and means for periodically raising said support and stop.

21. In a machine of the character set forth, the combination with means for conveying sheets in a given path, of a reciprocating blanking out die, sheet stops in said sheet path in position to be engaged and moved into inoperative position by said die, a rock shaft carrying arms from which said sheet stops are supported, a friction brake acting upon said rock shaft to normally hold it against motion, and a cam for periodically rocking said shaft and causing said sheet stops to move into active position.

22. In a machine of the character set forth, the combination with means for conveying sheets in a given path, of mechanism in a fixed station in said sheet path for operating upon sheets, stop gauges movable into and out of gauging position in the sheet path, an adjustable carriage supporting said stop gauges, means for adjusting said carriage in the sheet path, a reciprocating cam bar arranged parallel with the sheet path, and a gauge actuating member upon said carriage in engagement with said cam bar and free to move thereon when said carriage is adjusted in the sheet path.

23. In a machine of the character set forth, the combination with means for conveying sheets in a given path, of mechanism in a fixed station in said sheet path for operating upon sheets, stop gauges movable into and out of gauging position in the sheet path, a carriage adjustable parallel with the sheet path, a rock shaft journalled in said carriage and carrying said stop gauges, means for adjusting said carriage, a reciprocating cam bar arranged parallel with said carriage and sheet path, a rock arm on said rock shaft engaging said cam bar, and means for actuating said cam bar.

24. In a machine of the character set forth, the combination with means for conveying sheets, of a plurality of mechanisms for operating upon sheets, said mechanisms being arranged in successive fixed stations in the sheet path, and a plurality of sheet stops or gauges progressively arranged in said sheet path for arresting sheets successively in said fixed stations.

25. In a machine of the character set forth, the combination with means for conveying sheets, of a plurality of mechanisms for operating upon sheets, said mechanisms being arranged in successive fixed stations in the sheet path, and a plurality of sheet stops or gauges progressively arranged in said sheet path for arresting sheets successively in said fixed stations, the sheet stops or gauges for one of said mechanisms being adjustable longitudinally of the sheet path.

26. In a machine of the character set forth, the combination with means for continuously feeding a web, of periodically operating cut-off mechanism for cutting sheets from said web, means for conveying successive cut sheets, a plurality of mechanisms for operating upon sheets, said mechanisms being arranged in progressive fixed stations in the sheet path, and progressively arranged sheet stops in said sheet path for successively arresting sheets in said fixed stations.

27. In a machine of the character set forth, the combination with means for continuously feeding a web, of periodically operating cut-off mechanism for cutting sheets from said web, means for conveying successive cut sheets, a plurality of mechanisms for operating upon sheets, said mechanisms being arranged in progressive fixed stations in the sheet path, and progressively arranged sheet stops in said sheet path for successively arresting sheets in said fixed stations, some of said sheet stops being adjustable longitudinally of the sheet path.

28. In a machine of the character set forth, the combination with sheet forwarding means, of blanking out dies arranged in the sheet path and comprising lower die members, movably mounted chip ejecting plates cooperating with said lower die members, and upper die members arranged to operate said chip ejecting plates.

29. In a machine of the character set forth, the combination with the lower hollow die members, chip ejecting plates movably mounted in said lower die members in position to normally support parts of a sheet to be cut away, and cooperating upper die members arranged to operate said plates for ejecting chips cut from a sheet.

30. In a machine of the character set forth, the combination with the lower hollow die members, chip ejecting plates pivotally mounted in said lower die members, operating levers connected with said chip ejecting plates, and cooperating upper die members having parts projecting into the paths of said levers for actuating said chip ejecting plates.

31. In a machine of the character set forth, the combination with the lower hollow die members, chip ejecting plates mounted in said lower die members, pivotally mounted levers upon which said chip ejecting plates are movably mounted, tripping devices for said chip ejecting plates, and cooperating upper die members arranged to engage and operate said levers for actuating said chip ejecting plates.

32. In a machine of the character set forth, the combination with a hollow lower die member, a rock arm pivotally mounted upon said lower die member, a rock shaft journalled in said rock arm, a chip ejecting plate mounted upon said rock shaft and presented in said lower die member, a trip member upon said rock shaft, and a stud with which said trip member engages to rock said shaft and chip ejecting plate, of an upper cooperating die member arranged to engage said rock arm and actuate said chip ejecting plate.

MATTHEW VIERENGEL.